(12) United States Patent
Huang et al.

(10) Patent No.: US 7,245,408 B1
(45) Date of Patent: Jul. 17, 2007

(54) SYSTEMS AND METHODS FOR PRODUCING WIDE FIELD-OF-VIEW HOLOGRAPHIC DISPLAYS

(75) Inventors: Qiang Huang, Austin, TX (US); Michael A. Klug, Austin, TX (US)

(73) Assignee: Zebra Imaging, Inc., Austin, TX (US)

( * ) Notice: Subject to any disclaimer, the term of this patent is extended or adjusted under 35 U.S.C. 154(b) by 330 days.

(21) Appl. No.: 10/963,054

(22) Filed: Oct. 12, 2004

Related U.S. Application Data

(60) Provisional application No. 60/510,286, filed on Oct. 10, 2003.

(51) Int. Cl.
*G03H 1/04* (2006.01)

(52) U.S. Cl. .............................. 359/35; 359/24; 359/25; 365/125; 365/216; 369/103

(58) Field of Classification Search ............... 359/35, 359/24, 25; 365/125, 216, 234; 369/103
See application file for complete search history.

(56) References Cited

U.S. PATENT DOCUMENTS

| | | | | |
|---|---|---|---|---|
| 3,748,015 | A | 7/1973 | Offner | 350/55 |
| 5,044,708 | A | 9/1991 | Garcon | 359/8 |
| 5,519,651 | A * | 5/1996 | Redfield | 365/125 |
| 6,141,123 | A * | 10/2000 | Nakashima et al. | 359/3 |
| 6,157,473 | A * | 12/2000 | Jang et al. | 359/22 |
| 6,330,088 | B1 | 12/2001 | Klug et al. | 359/23 |
| 6,331,904 | B1 * | 12/2001 | Daiber et al. | 359/32 |
| 6,549,308 | B1 | 4/2003 | Camahort | 359/9 |
| 6,700,686 | B2 * | 3/2004 | King et al. | 359/11 |
| 6,806,982 | B2 | 10/2004 | Newswanger et al. | 359/35 |
| 6,930,811 | B2 | 8/2005 | Brotherton-Ratcliffe et al. | 359/22 |
| 2004/0050280 | A1 | 3/2004 | Rodin et al. | 101/494 |
| 2004/0114204 | A1 | 6/2004 | Klug et al. | 359/15 |
| 2004/0227927 | A1 * | 11/2004 | Battiato et al. | 356/37 |
| 2006/0001936 | A1 * | 1/2006 | Chen | 359/35 |

OTHER PUBLICATIONS

G.Barbastathis and D.Psaltis, "Volume holographic multiplexing methods", in "Holographic Data Storage", H.J.Coufal, D. Psaltis and G.T.Sincerbox Eds., pp. 21-22.*

* cited by examiner

*Primary Examiner*—Leonidas Boutsikaris
(74) *Attorney, Agent, or Firm*—Campbell Stephenson LLP (57) ABSTRACT

Hologram recording devices and techniques can be employed to produce wide-field-of-view holograms. In one embodiment, a specialized lens is used to couple an object beam into a holographic recording material without substantially changing the angle of incidence of the object beam. When displayed, images from holograms recorded using technique can have a field-of-view greater than that of the object beam. In another embodiment, one or more aspheric reflective surfaces are used to couple an object beam into a holographic recording material at relatively steep angles.

25 Claims, 4 Drawing Sheets

SYSTEMS AND METHODS FOR PRODUCING WIDE FIELD-OF-VIEW HOLOGRAPHIC DISPLAYS

This application claims the benefit, under 35 U.S.C. § 119 (e), of U.S. Provisional Application No. 60/510,286, filed Oct. 10, 2003, entitled "Systems And Methods For Producing Wide Field Of View Holographic Displays," and naming Qiang Huang and Michael A. Klug as inventors. The above-referenced application is hereby incorporated by reference herein in their entirety.

BACKGROUND OF THE INVENTION

1. Field of the Invention

The present invention relates in general to the field of hologram production and, more particularly, to wide field-of-view hologram production.

2. Description of the Related Art

Numerous devices and techniques have been disclosed for producing and displaying various types of holograms including one-step techniques, updateable techniques, techniques relying on fringe pattern calculation, and traditional object/reference beam interference techniques. Moreover, the subject matter of the scenes displayed in such holograms varies from simple demonstration scenes, to artistic renderings, to portraits, to scenes of complex devices or spaces, and beyond.

For many applications of holography, it is desirable that the hologram be able to display as large a field-of-view as possible. For example, a hologram that is designed to display an image of terrain can be placed on a horizontal surface (e.g., a table top) for viewing by multiple individuals. Ideally, the hologram would produce an image with a 180° field-of-view. Thus, a viewer would still be able to see the hologram when they are looking at the edge of the horizontal surface.

Current reflection and transmission holograms produced by state-of-the-art pulsed laser and CW laser devices and techniques typically have a field-of-view limited in part by the complexity of the Fourier transform optics employed by the hologram recorders. For example, many devices developed by Zebra Imaging, Inc. (the assignee of the present application) produce holograms with an approximately 97° field-of-view. Although this is a fairly wide field-of-view in comparison with most holographic displays, it is still not optimal for many display applications, particularly disk format holograms where the reference beam is normal to the hologram surface and the hologram is designed to be viewed on a horizontal surface (e.g., a table top).

Accordingly, it is desirable to have improved systems and methods for producing and displaying wide field-of-view holograms to overcome the above-identified deficiencies in the prior art.

SUMMARY OF THE INVENTION

It has been discovered that hologram recording devices and techniques can be employed to produce wide field-of-view holograms. In one embodiment, a specialized lens is used to couple an object beam into a holographic recording material without substantially changing the angle of incidence of the object beam. When displayed, images from holograms recorded using technique can have a field-of-view greater than that of the object beam. In another embodiment, one or more aspheric reflective surfaces are used to couple an object beam into a holographic recording material at relatively steep angles.

Accordingly, one aspect of the present invention provides an apparatus including a light source, a beam splitter, an object beam optical system, and a reference beam optical system. The light source produces a coherent beam. The beam splitter splits the coherent beam into an object beam and a reference beam. The object beam optical system directs the object beam to interfere with the reference beam at a holographic recording material. The object beam optical system includes a first lens configured to focus the object beam to a location within the holographic recording material, and a second lens having a first surface and a second surface. The first surface is configured to receive the object beam normal to the first surface, and the second surface is coupled to the holographic recording material to transmit the object beam into the holographic recording material with substantially no change in an angle of the object beam. The reference beam optical system directs the reference beam to interfere with the object beam at the holographic recording material.

Another aspect of the present invention provides a method. A holographic recording material is provided. Data for at least one hogel is provided to a spatial light modulator. An object beam from a laser is intensity modulated with the spatial light modulator. The object beam is coupled into the holographic recording material without substantially changing an angle of incidence of the object beam. A portion of the holographic recording material is exposed to an interference pattern formed by a reference beam from the laser and the object beam from the laser.

Still another aspect of the present invention provides an apparatus including a light source, a beam splitter, an object beam optical system, and a reference beam optical system. The light source produces a coherent beam. The beam splitter splits the coherent beam into an object beam and a reference beam. The object beam optical system directs the object beam to interfere with the reference beam at a holographic recording material. The object beam optical system includes a collimating lens configured to collimate the object beam, and an aspheric reflector configured to focus the collimated object beam to a location within the holographic recording material. The aspheric reflector is positioned with respect to the holographic recording material so that a focus of the aspheric reflector substantially coincides with the holographic recording material. The reference beam optical system directs the reference beam to interfere with the object beam at the holographic recording material.

Yet another aspect of the present invention provides a method. A holographic recording material is provided. Data for at least one hogel is provided to a spatial light modulator. An object beam from a laser is intensity modulated with the spatial light modulator. The object beam is reflected from an aspheric reflector. The aspheric reflector is positioned with respect to the holographic recording material so that a focus of the aspheric reflector substantially coincides with the holographic recording material. A portion of the holographic recording material is exposed to an interference pattern formed by a reference beam from the laser and the object beam from the laser.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present inventions may be better understood, and their numerous objects, features, and advantages made apparent to those skilled in the art by referencing the accompanying drawings.

DETAILED DESCRIPTION

The following sets forth a detailed description of the best contemplated mode for carrying out the invention. The description is intended to be illustrative of the invention and should not be taken to be limiting.

The holograms, devices for use with holograms, and related techniques described in the present application can generally make use of a variety of hologram production technologies including one-step techniques, updateable techniques, techniques relying on fringe pattern calculation, and traditional object/reference beam interference techniques.

One-step hologram (including holographic stereogram) production technology has been used to satisfactorily record holograms in holographic recording materials without the traditional step of creating preliminary holograms. Both computer image holograms and non-computer image holograms can be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is typically directed through or reflected from a spatial light modulator (SLM) displaying a rendered image and then interfered with a reference beam. Examples of techniques for one-step hologram production can be found in U.S. Pat. No. 6,330,088 entitled "Method and Apparatus for Recording One-Step, Full-Color, Full-Parallax, Holographic Stereograms," naming Michael A. Klug, Mark E. Holzbach, and Alejandro J. Ferdman as inventors, ("the '088 patent") which is hereby incorporated by reference herein in its entirety.

In general, the techniques described in the '088 patent and other prior art techniques do not provide for both hologram recording and display in real-time. Moreover, these techniques are not designed to produce active or quickly-updateable displays. However, certain types of holographic recording materials can be used to updateably record holographic stereograms formed either from calculated fringe patterns displayed on specialized SLM, or from fringe patterns generated through interference of an object laser beam containing image information with a reference laser beam. Previously recorded holographic stereograms or component hogels are updated by erasing the stereograms or component hogels and recording updated stereograms or component hogels, or by recording updated stereograms or component hogels in a separate portion of the holographic recording material. Examples of such techniques for hologram production can be found in U.S. patent application Ser. No. 10/691,041 entitled "Active Digital Hologram Display," naming Michael A. Klug, Craig Newswanger, Qiang Huang, and Mark E. Holzbach as inventors, ("the '041 application") which is hereby incorporated by reference herein in its entirety.

While the hologram recording devices described, for example, in the '088 patent make use of both continuous wave (CW) and pulsed lasers, CW lasers can be less desirable for updateable holographic displays because they present certain limitations. Chief among those limitations is the relatively low output power of CW lasers which causes the hologram recorder to use relatively long exposure times (e.g., tens of milliseconds) for each hogel. During those exposure times, the entire hologram production system is particularly susceptible to mechanical vibration. Great effort is expended to reduce or eliminate the mechanical vibrations. Hologram recorders are typically located far away from sources of environmental vibration, such as outside traffic, building vibration, mechanical equipment, common appliances, human motion, acoustic noise, plumbing turbulence and air flow. Special devices, such as vibrationally-isolated optics tables, are typically used where environmental vibration sources cannot be sufficiently reduced or eliminated. Such devices and techniques add cost and complexity to hologram production systems. Moreover, to help ensure a stable hogel recording environment, a step-repeat approach is often adopted in translating the holographic recording medium or the recording optics with respect to the recording medium. Consequently, additional settling time (on the order of tens of milliseconds as well) is introduced into the recording process. The cumulative recording and settling times prolong the hologram production process, often making it impractical for certain applications. Moreover, the mechanical systems used to step the system, bring (or allow) the system to come to a stop, and repeat can be very complex.

Using pulsed lasers in hologram production devices can mitigate or solve many of the aforementioned problems associated with CW laser use. Due to the different physics of pulsed laser operation, a small frame pulsed laser is able to generate higher light intensity than its CW counterparts. For example, small frame frequency doubled Nd:YAG pulsed lasers can generate 1.1 mJ of energy during a 35 ns long pulse at 532 nm. This corresponds to approximately 31.4 kW of power during the pulse. In contrast, a typical CW Nd:YAG laser produces approximately 4 W of power. Because high exposure intensity is possible using pulsed lasers, the required exposure time to generate a hologram can be reduced significantly. While tens of milliseconds is typically needed for CW laser hologram recording, the tens of nanoseconds pulse duration of a pulsed laser is adequate for pulsed laser hologram recording. Decreasing the exposure time by six orders of magnitude means that the frequencies of both the movement of the hologram recorder components and environmental vibration are too low to generate any noticeable effect on interference pattern generation. The mechanical stability requirements restricting the CW laser based hologram recorder are significantly relaxed. Consequently, the recorder design can be significantly simplified and the cost of the hardware is reduced.

Thus, although the presently described systems and methods are not limited to the use of pulsed laser systems, the use of pulsed laser systems will be emphasized in this description. Moreover, the systems and methods described herein can make use of the devices and processes for recording holograms using pulsed lasers as described in U.S. patent application Ser. No. 10/167,759 entitled "Pulsed-Laser Systems and Methods for Producing Holographic Stereograms," naming Craig Newswanger, Pankaj Lad, Robert L. Sitton, Qiang Huang, Michael A. Klug, and Mark E. Holzbach as inventors, (the '759 application) which is hereby incorporated by reference herein in its entirety.

Figure 1:
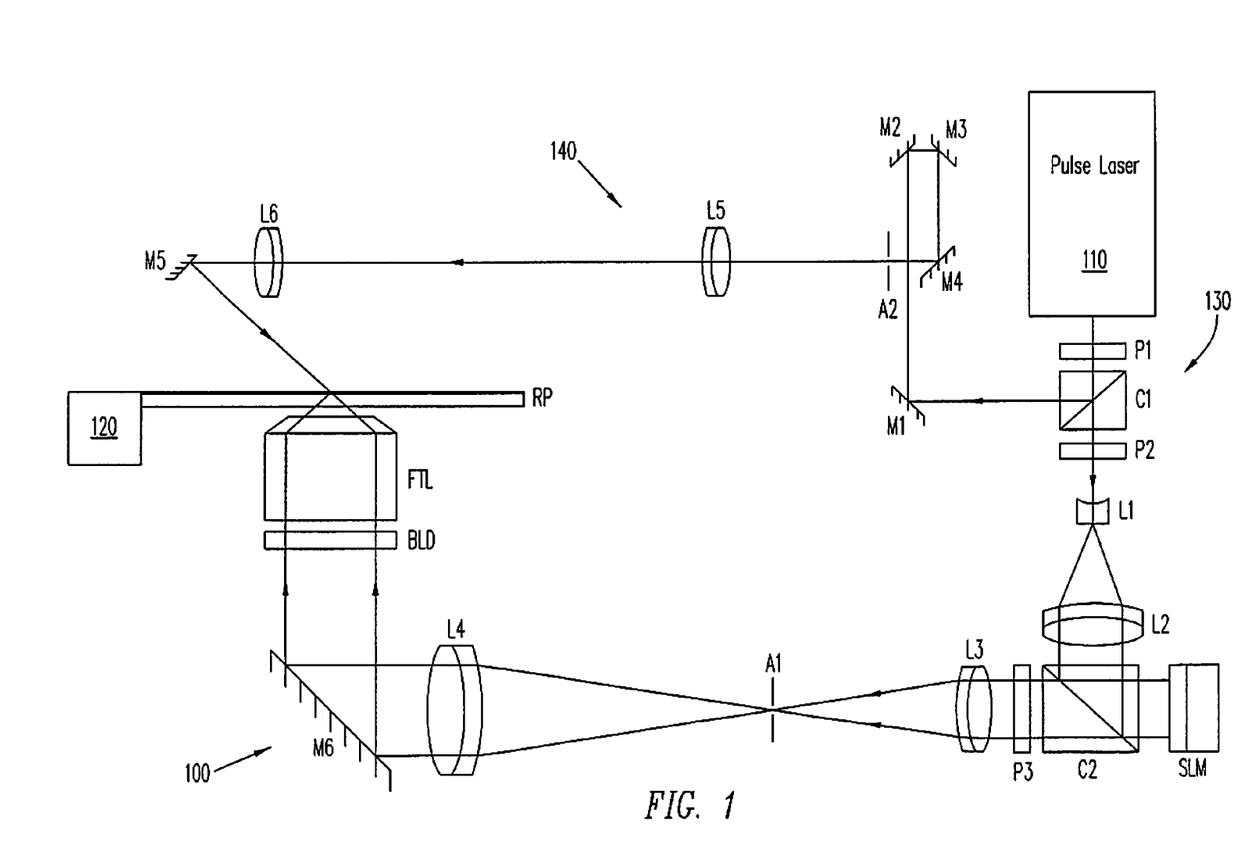
FIG. 1 is a schematic diagram of a hologram production device using a pulsed laser.

FIG. 1 is a schematic diagram of a pulsed laser based hologram production device that can take advantage of, for example, the hologram production techniques described in the '759 application, the '041 application, and the '088 patent, and can be used in conjunction with the devices and techniques described herein. Although a pulsed laser is illustrated, similar systems can use CW lasers. Hologram recorder 100 is designed to rapidly produce horizontal-parallax-only (HPO) or full parallax holograms and particularly holographic stereograms. The main components of hologram recorder 100 are pulsed laser 110, synchronized holographic recording material translating system 120, object beam optical system 130 and reference beam optical system 140. In other implementations, the recording material is kept stationary, and object beam optical system 130 and reference beam optical system 140 are translated with respect to the recording material. In still another implementation, object beam optical system 130 and reference beam optical system 140 are combined together so that only one optical system need be translated.

Although hologram recorder 100 is shown having only one pulsed laser, hologram recorder 100 can in general be constructed with several different pulsed lasers (or one pulsed laser capable of providing laser output at multiple wavelengths) to enable recording of multi-color holograms and holographic stereograms. Thus, the systems and methods described in the aforementioned '088 patent can be extended to the use of pulsed laser hologram recorders such as recorder 100.

An example of a pulsed laser 110 that can be used in hologram recorder 100 is the 212 Series (e.g., model 212S-532-3500) diode-pumped, Q-switched pulsed Nd:YAG laser manufactured by Lightwave Electronics Corporation of Mountain View, Calif. Those having ordinary skill in the art will readily recognize that a variety of different pulsed lasers can be used in hologram recorder 100. In general, the laser wavelength, laser pulse power, and laser pulse energy of a particular pulsed laser system are the determining factors for use in a hologram recorder.

For multiple color, e.g., red-green-blue (RGB), laser pulses, a variety of different laser systems can be used including diode-pumped solid state lasers, flash-lamp pumped solid state lasers, and dye lasers. Typical solid-state laser gain media include ruby, sapphire, garnet, alexandrite, Titanium sapphire (Ti:sapphire), Neodimium:Yttrium Aluminum Garnet (Nd:YAG), and Neodimiuni:Yttrium Lithium Fluoride (Nd:YLF). In one example, optical parametric oscillators (OPOs) are used to down convert laser frequency. For example, a frequency tripled Nd:YAG laser can produce 355 nm pulses which in turn drive a tunable OPO to produce pulses ranging from 410 nm to 690 nm. In another example, a Nd:YLF laser produces 1047 nm pulses which are then converted through second-harmonic generation to 523 nm pulses used to drive an OPO. Output from the OPO at 898 nm and 1256 nm can be frequency doubled through second harmonic generation to yield 449 nm and 628 nm pulses respectively. In another example, Raman converters can be utilized. The output of a pulsed alexandrite laser (e.g., 764 nm pulses) is frequency doubled through second harmonic generation to yield 382 nm pulses. These pulses then pass through a Raman cell including Deuterium Hydride (HD) gas. Careful selection of the input pulse can yield, for example, output laser pulse of 443 nm, 527 nm, and 650 mm. Other types of pump lasers, e.g., Nd:YAG and Nd:YLF, and other gases for the Raman cell, e.g., Deuterium ($D_2$) or methane ($CH_4$), can be used. Moreover, some combination of all or some of these techniques and lasers can be used to produce the desired pulse wavelengths.

The pulsed laser beam produced by pulsed laser 110 is split into object and reference beams by the beam splitter C1, typically a polarizing beamsplitter cube. The polarizations and relative intensities of the object and reference beams (i.e., the beam ratio) are controlled by retarders P1 and P2, typically half-wave plates.

The object beam is then expanded and collimated by a collimator formed through the combination of lenses L1 and L2. Next, the object beam is reflected by beamsplitter cube C2 into spatial light modulator (SLM) SLM where the object beam wavefront is intensity modulated. Spatial light modulator SLM as illustrated is a reflective SLM which rotates the polarization state of the object beam. In general, a variety of different SLMs can be used including, but not limited to, a transmissive LCD panel, a reflective LCD panel, an optically addressed LCD panel, a digital micro-mirror array, film, or a transparency. The SLM typically receives image input via a video cable from a computer system (not shown). Additionally, multiple SLMs can be used having images generated in parallel by multiple central processing units or computer systems. Thus, the response time of the SLM is typically an important parameter. Examples of SLMs for use in hologram recorder 100 include the Digital Direct Drive Image Light Amplifier (D-ILA®) series of reflective LCD devices manufactured by the Victor Company of Japan, Ltd. (JVC). Additionally, a single multiple color SLM can be used, or multiple SLMs can be used (typically one SLM for each beam color). The images displayed on the SLM, and thus the images used to intensity modulate the object beam, are typically computer graphics images (either rendered or converted images of real objects) designed and/or processed for recording as holograms.

The modulated wavefront is relayed and filtered by the lens pair L3 and L4 and aperture A1 to then form an image on a band-limited diffuser or an anisotropic diffuser BLD. Note that, in general, the diffuser can be located in a variety of different positions throughout the system. The image then passes through a Fourier transform lens FTL thereby generating the desired object beam wave front at the holographic recording material positioned on recording plate RP. Note that although hologram recorder 100 is shown using lens pair L3 and L4, to, for example, remove undesired effects such as, but not limited to, high frequency image components such as pixel or grid artifacts that resulted from an SLM display with pixels, a variety of different optical systems can be used.

In reference beam optical system 140, the reference beam is transmitted through path length matching optics (mirrors M1, M2, M3, and M4) and illuminates the reference beam-shaping aperture A2. Path length matching optics are used to adjust the path length of the reference beam path to match that of the object beam, or to at least bring the two paths within a distance of each other that is less than or equal to the coherence length of pulsed laser 110. For some pulsed lasers, the coherence length can be on the order of several millimeters. The image of shaping aperture A2 is then relayed via reference beam relay optics L5 and L6 to the holographic recording material at recording plate RP. As shown, the angle of incidence of the reference beam with respect to the surface normal of the holographic recording material at recording plate RP is preferably oblique, and further preferably approximates 45°. In other examples, the angle of incidence of the reference beam with respect to the surface normal of the holographic recording material is approximately 0°. A variety of different techniques can be used steer either or both of the reference beam and the object beam. For example, the devices and techniques of the aforementioned '088 patent can be utilized. Finally, the object and reference beams are superimposed at the holographic recording material on recording plate RP producing the interference pattern required for hologram (or hogel) recording.

In the example of FIG. 1, the optics systems 130 and 140 are generally kept stationary during the operation of hologram recorder 100 while the synchronized holographic recording material translating system 120 is used to reposition the holographic film located at recording plate RP for each hogel that is recorded. Synchronized holographic recording material translating system 120 is typically a computer controlled x-y translation system. In one example, synchronized holographic recording material translating system 120 includes a 300AT series positioning system manufactured by the Daedal Division (Irwin, Pa.) of the Parker Hannifin Corporation and an ACR2000 position controller manufactured by Acroloop Motion Control Systems, Inc., of Chaska, Minn. In systems where the holographic recording material is kept stationary, similar devices and techniques can be used to translate object beam optical system 130 and reference beam optical system 140 with respect to the recording material. Moreover, devices and techniques for synchronizing device translation, SLM computer graphics image display, and laser pulsing are described in greater detail in the aforementioned '759 application.

It should be noted that it is well within the skill of one having ordinary skill in the art to substitute different optical components for many of the specific optical components shown in FIG. 1. For example, a variety of different polarizing devices, beam splitters, collimating optics, lenses, SLMs and mirrors can be used in hologram recorder 100. Additionally, although FIG. 1 illustrates a system for producing reflection holograms, systems for producing transmission holograms using the devices and techniques described above can also be implemented.

A variety of different types of holographic recording material can be used with the techniques discussed herein. One example of the type of recording materials that can be used is photopolymerizable compositions (photopolymers) because of their image recording capabilities and their relative ease of use. Photopolymers include a wide range of materials that undergo physical, chemical, or optical changes through selective polymerization when exposed to light. Photopolymers capable of recording volume phase holograms include those developed by Canon Incorporated (based on polyvinyl carbazole), Polaroid Corporation (based on polyethylene amine/acrylate), Daiso Co. Ltd., and E. I. du Pont de Nemours and Company (based on polyvinyl acetate and polymethyl methacrylate). Those having ordinary skill in the art will readily recognize that a variety of different photopolymer compositions can be used in the practice of the inventions described herein. Nevertheless, preferred photopolymer films are provided by E. I. du Pont de Nemours and Company under the trade designations, for example, OmniDex™ 706, OmniDex™ 801, HRF-800× 001-15, HRF-750×, HRF-700×, HRF-600×, and the like. Numerous other holographic recording materials can be used, depending in part on the nature of the hologram production technique. Those materials include, but are not limited to: specialized photopolymer systems used for rewritable systems, such as the polymer systems using two independently polymerizable chemical systems (low-refractive index matrix precursors and high-refractive index photopolymerizable monomers) developed for holographic storage by InPhase Technologies; traditional photorefractive materials such as bismuth silicon oxide ($Bi_{12}SiO_{20}$), lithium niobate ($LiNbO_3$), barium titanate ($BaTiO_3$), cadmiun sulfide (CdS), gallium arsenide (GaAs) and indium phosphide (InP); classes of chalcogenide compounds; thermally-deformable materials; liquid crystals; polymer-dispersed liquid crystals; organic photopolymers; and optically addressable SLMs.

The basis unit for the digital hologram displays described herein is the holographic element, or "hogel". Each hogel is capable of storing the intensity and direction for millions of light rays, as distributed by angular orientation. A hogel is formed through the interference of a transformed beam of light with a (usually collimated) reference beam. In the simplest form, the transform would be a Fourier transform of a greyscale mask or image, accomplished via the placement of the mask at the back focal plane of a lens. As described in the '088 patent, introduction of a digital optical element is typically coincident with the mask that produces band-limited diffusion of the focused beam at the transform plane. This element can be used to create a diffuse spot of light of any desired shape or size. A reference beam, typically composed of a non-diffuse, but nominally planar wavefront, may be introduced into the diffuse spot from any direction in order to form the hogel interference pattern. The hogel is an interference pattern that can reproduce the specific angles and intensities of the data beam when illuminated with a replica of the reference beam or the phase conjugate of the reference beam. Thus, the data beam contains the perspective, intensity, and possibly also the phase information for the hogel area on the hologram plane, and that information is encoded through interference with the reference beam. As either the film or the optics are indexed (e.g., translated), an array of hogels is recorded or "written" in the medium through successive interference with the reference beam. The reference beam angle may change for each hogel so that the final array may be illuminated with a variety of different light sources including diverging point sources or a converging beam, if desired, without distortion of the image. This also enables a single point source illumination beam to substantially fulfill the Bragg condition for each hogel on replay.

Typical holographic recording devices, such as those described in the '088 patent and the '759 application, employ fast (e.g., f/0.75) lenses to perform a Fourier transform of the object beam wavefront for hogel recording. Using such a refractive optics device, it can be difficult and expensive to achieve desired levels of performance such as field-of-view, while still minimizing all monochromatic and chromatic aberrations. Thus, in contrast to the refractive optics approach, reflective optics (and in particular aspheric reflective optics) can be utilized as described below. Compared with the refractive counterpart, it is typically easier to achieve wide field-of-view (180° in principle) using the reflective optics approach.

Figure 2:
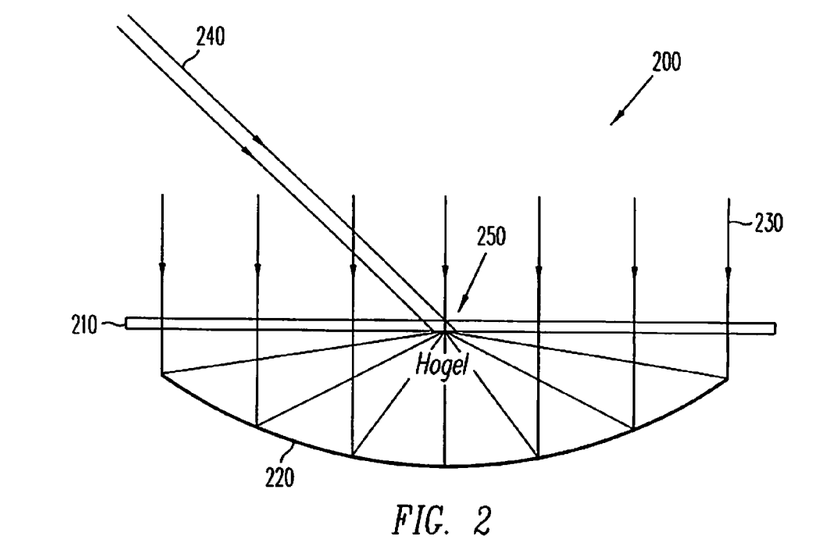
FIG. 2 illustrates a simplified diagram of one example of a wide field-of-view hologram recording device and technique.

FIG. 2 illustrates a simplified diagram of one example of a wide field-of-view hologram recording device and technique. Recorder 200 is configured to record reflection holograms without the use of lenses such as lens FTL of FIG. 1. As shown, the holographic recording material 210 is positioned above parabolic reflector 220. Parabolic reflector 220 is positioned with respect to holographic recording material 210 so that the focus of the reflector generally coincides with the portion of holographic recording material 210 in which a hogel (e.g., hogel 250) is to be recorded. Thus, the planar wavefront of object beam 230 (e.g., passing through band-limited diffuser BLD but not lens FLT of FIG. 1) passes through holographic recording material 210, and is reflected back to the reflector's focus. Reference beam 240 is directed at the same portion of the holographic recording material. Reference beam 240 and object beam 230 form an interference pattern which is recorded at hogel 250. Note that although reference beam 240 is shown as being introduced off-axis, it can generally be directed at any desired angle, e.g., normal to holographic recording material 210 to record a disk-format hologram. Moreover, parabolic reflector 220 will typically include an aperture (not shown) through which reference beam 240 can pass so that it is not reflected by the mirror. Such reflection of the reference beam can substantially reduce the clarity of the recorded hogel.

With proper selection of the shape of the parabolic mirror and the location of its focus with respect to the holographic recording material, the object beam can be introduced at very high angles (with respect to the surface normal) and therefore yield holograms with very wide field-of-view. In addition to the wide field-of-view, there are several other advantages to using reflective optics. Reflective optics typically introduce no chromatic aberrations into the system. Moreover, in the geometry illustrated in FIG. 2, the reflector has only one parabolic surface. This geometry reduces or eliminates the spherical aberration of the system, aberration that is otherwise inherent in refractive optical systems. Aspheric shapes other than paraboloidal can also be used for the reflector. Various different techniques are used to fabricate such aspheric reflectors as is well known to those having skill in the art.

Hogels have been recorded using devices such as those illustrated in FIG. 2, and have demonstrated that the feasibility of achieving very wide field-of-view using a parabolic reflector. However, use of this type of reflector can pose certain challenges for some implementations. In the configuration of recorder 200, object beam 230 is transmitted through holographic recording material 210. If the beam cross-section area is large enough, the exposure energy density will be low enough that it will cause no significant exposure/damage to the recording material during the transmission. However, many holographic recording materials can absorb a significant amount of a energy from such an object beam. In one example, the transmittance of a 532 nm laser beam through a sample of du Pont OmniDex™ 801 photopolymer is measured to be approximately 40%. Consequently, the intensity of the object beam passing through the recording material can be strongly attenuated. Even if the energy absorbed during transmission has low density, the exposure time may be quite extended so that it is difficult to prevent the recording material from being exposed/damaged during the transmission stage. Even if absorption of the object beam during its first pass through the recording material does not adversely affect the material, it may reduce the intensity of the object beam to undesirable levels. Thus, the scattering of the object beam by the recording material could cause the signal to noise ratio of the image to drop.

Figure 3:
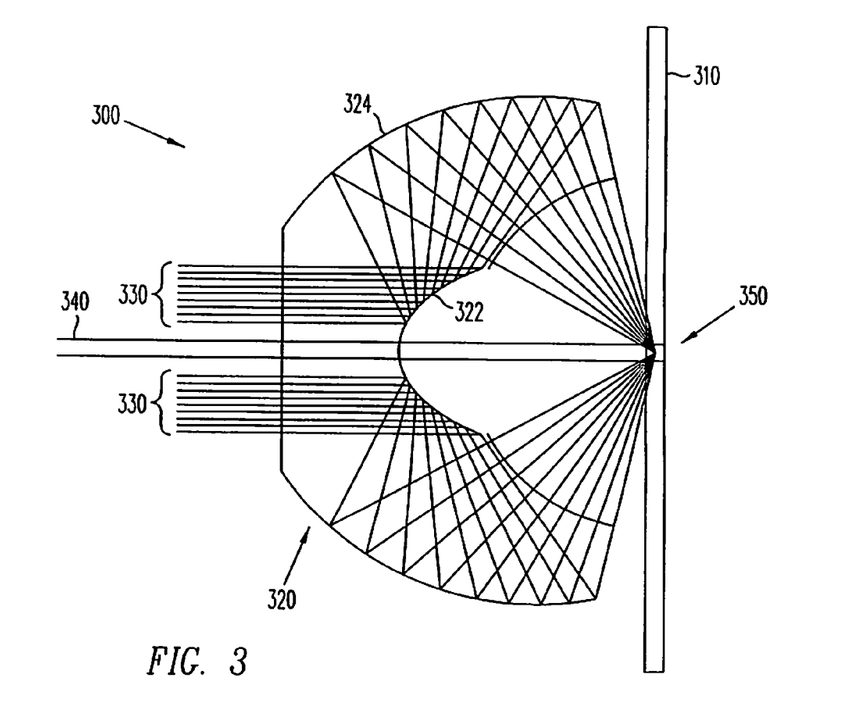
FIG. 3 illustrates a simplified diagram of another example of a wide field-of-view hologram recording device and technique.

An alternative method and apparatus that eliminates the need to transmit the object beam through the holographic recording material prior to hogel formation is illustrated in FIG. 3. Recorder 300 is configured to record transmission holograms without the use of lenses such as lens FTL of FIG. 1. As shown, the holographic recording material 310 is positioned relative to reflector system 320 which includes two aspheric reflective surfaces 322 and 324. In this example, reflector system 320 is positioned with respect to holographic recording material 310 so that one of the foci of reflective surface 324 (an elliptical reflective surface) generally coincides with the portion of holographic recording material 310 in which a hogel (e.g., hogel 350) is to be recorded. Thus, the planar wavefront of object beam 330 (e.g., passing through ban limited diffuser BLD but not lens FLT of FIG. 1) is reflected off reflective surface 322 (in this case a parabolic reflective surface) and on to reflective surface 324 where it is reflected to that surface's focus. Reference beam 340 is directed at the same portion of the holographic recording material. Reference beam 340 and object beam 330 form an interference pattern which is recorded at hogel 350.

Note that the recording system illustrated is shown configured for transmission disk format hogel recording. Thus, reflective system 320 is designed to allow reference beam 340 to pass through, either using an aperture in the system to accommodate the reference beam, or using optical surfaces that (e.g., where the reference beam is incident on the reflector system) do not excessively degrade the quality of the reference beam. In still other examples, reflection holograms can be recorded using such a system, and the reference beam is incident on holographic recording material 310 from a side opposite that of object beam 330. In such examples, reflector system 320 may not need to be configured to accommodate the reference beam. Additionally, although reference beam 340 is shown as being introduced on-axis, it can generally be directed at any desired angle, so long as reflector system 320 is designed to accommodate the reference beam.

Reflector system 320 generally includes two aspheric reflective surfaces designed and oriented with respect to each other so that a collimated object beam impinges the first surface, in this example a convex parabolic reflector. The first surface reflects the light as if emitting it from a virtual point source located at the focus of the parabolic reflector. The reflected light is collected by the second reflective surface, which is typically ellipsoidal as in the case of surface 324. With one of its foci coincident with the parabolic focus, the ellipsoidal reflector refocuses the beam into a point at its second focus. In this configuration, it is desirable to accurately align the two reflective surfaces in order to prevent coma. Thus, in one embodiment, reflector system 320 is fabricated from one piece of material to avoid a potentially difficult alignment process. For example, the optics can be shaped on one piece of glass and reflective coatings can be applied on both internal and external sides. In other embodiments, the reflective surfaces are fabricated separately but include suitable alignment mechanisms. To avoid refraction related deflection at the region where the beam enters and exits the optics, additional planar and spherical surfaces can be placed.

The design illustrated in FIG. 3 retains the practical effect of the previous design. This configuration also introduces little or no chromatic and spherical aberration, and it is able to generate a very large field-of-view. Moreover, it successfully eliminates the need for the object beam to pass through the recording material prior to hogel formation. Recording system 300 is particularly suited for disk format holograms because a small range of solid angle around the optical axis will typically be blocked. This will result in a dark disk in the center of the image produced by the hologram if an off-axis illumination beam is used to display the hologram. Such an effect will be less important for disk format holograms since the zero order of the diffracted beam overlaps with the optical axis. Moreover, the image content in this range is likely be overpowered by reflection of the illumination light source.

Simulation of the designs of both FIG. 2 and FIG. 3 have been conducted to assess imaging performance. It was found that in some cases the image quality produced by these designs was less that desired. Since these designs are skewed toward producing holograms with very large fields-of-view, they subsequently also tend to produce some geometric distortion and aberration for image points not on the optical axis. However, this distortion does not pose significant problems because these are not imaging systems typically intended to produce flat-screen focused displays. For example, one of the poorer imaging quality issues is production of a sharp edged hogel pattern when a band limited diffuser is used. Thus, in some embodiments it may be desirable to use physical apertures to mask out the hogel pattern for recording in order to counteract this distortion. In still other examples, pre-distortion techniques can be used to modify the source image (e.g., the CGI image displayed in a spatial light modulator through which the object beam passes) so that the final image produced by these wide field-of-view techniques has improved quality. Examples of such techniques can be found, for example, in U.S. Pat. No. 6,549,308 entitled "Unbiased Light-Field Models for Rendering and Holography," and in U.S. patent application Ser. No. 10/251,931 entitled "Distortion Correcting Rendering Techniques for Autostereoscopic Displays," naming Mark E. Holzbach as the inventor, both of which are hereby incorporated by reference herein in their entirety.

One practical concern for very large field-of-view recording systems shown in FIGS. 2 and 3 is energy penetration into the recording material for the most oblique object beam rays. When the object beam is incident on the holographic recording material, steeper incident angles of object mean rays cause more object beam energy to be reflected of the material surface instead of penetrating into the material to record a hologram. This effect can be seen from careful analysis of the Fresnel equations, which give the ratio of the reflected and transmitted electric field amplitude to initial electric field for electromagnetic radiation incident on a dielectric. In general, when a wave reaches a boundary between two different dielectric constants, part of the wave is reflected and part is transmitted, with the sum of the energies in these two waves equal to that of the original wave. Since electromagnetic waves are transverse, there are separate coefficients in the directions perpendicular to and parallel to the surface of the dielectric. The result of this increase in the reflected object beam at steep angles is an image whose brightness generally decreases for points of view most distant from the normal of the hologram surface. The gratings formed by such steep angle object beam rays become more attenuated than those formed by object beam rays having less steep incident angles. Such an effect is generally undesirable.

Figure 4A:
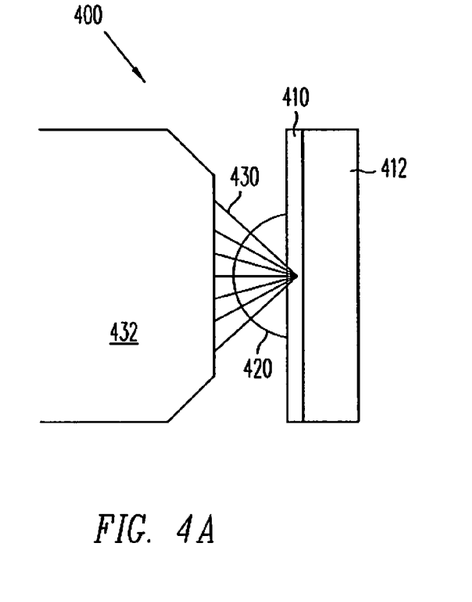
FIGS. 4A–4B illustrate a simplified diagram of yet another example of a wide field-of-view hologram recording device and technique.
Figure 4B:
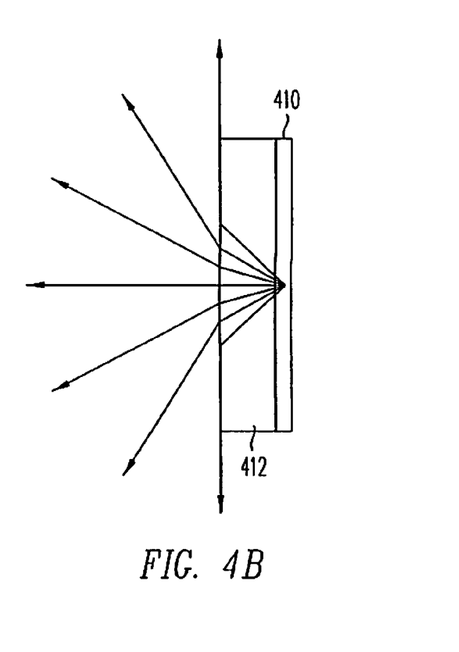

Thus, in addition to the reflective optic systems described in conjunction with FIGS. 2 and 3, additional refractive optic systems have been developed to improve the field-of-view of recorded holograms. FIGS. 4A–4B illustrate one embodiment of a hologram recorder using such refractive optics to improve hologram recording performance. Recorder 400 is configured to record reflection holograms in a manner similar to the recorder illustrated in FIG. 1. Lens 432 (similar to lens FTL from FIG. 1) provides an object beam 430 that is focused and directed at holographic recording material 410. In this example, holographic recording material 410 is shown positioned on a substrate material 412 as is common in most recording systems. For convenience, a reference beam is not shown, but would be used as is well known in the art. See, for example, the configuration of FIG. 1.

Instead of having the converged object beam entering the recording material directly from the output of Fourier transform lens 432, recorder 400 uses a hemispherical (sometimes referred to as "half-ball") lens 420 that is inserted in between lens 432 and holographic recording material 410. Hemispherical lens 420 is designed to directly couple object beam 430 into holographic recording material at the same angle of incidence at which the object beam immerges from lens 432, i.e., without additional refraction of the object beam. To that end, hemispherical lens 420 is typically selected to have an index of refraction close to (or identical to) that of holographic recording material 410. The size of hemispherical lens 420 is selected to ensure that object beam rays are normal (or approximately normal) to the lens surface when they intersect the lens, thereby reducing or eliminating refraction as the object beam crosses the interface from outside to inside lens 420. Since it is generally desirable that light from the Fourier transform lens be normally incident on the inserted lens at every point on the lens, some implementations can use specially shaped lenses other than hemispherical lenses.

The center of the hemispherical lens 420 is positioned to generally coincide with the focus point of the object beam, resulting in no additional refraction of the object beam inside the recording material. Very high internal angles are possible with this geometry, since no low-to-high index transitions take place for impinging light rays. FIG. 4B illustrates image reconstruction from a hologram recorded using system 400. The image wavefront is refracted at the plane surface of substrate 412, and the field-of-view of the image is widened by the corresponding high-to-low refractive index transition that the rays experience. A simple calculation using Snell's law reveals that the reconstructed beam can theoretically reach a full field-of-view of 180° with only 84° degrees of the angular range out of Fourier transform lens 432. Although FIG. 4B illustrates the hologram wavefront passing through substrate 412, similar results can be achieved without the presence of the substrate due to the bulk refractive properties of the holographic recording material. Fourier transform lenses used in some current hologram recorders are capable of a 97° degree range of output ray angles, which is more than adequate for this approach. Moreover, the requirements of current Fourier transform lenses could even be relaxed, simplifying their design and reducing their cost. Lens 432 and lens 420 can be combined into a single refractive system, and/or designed with each other's characteristics in mind.

Figures 5A, 5B:
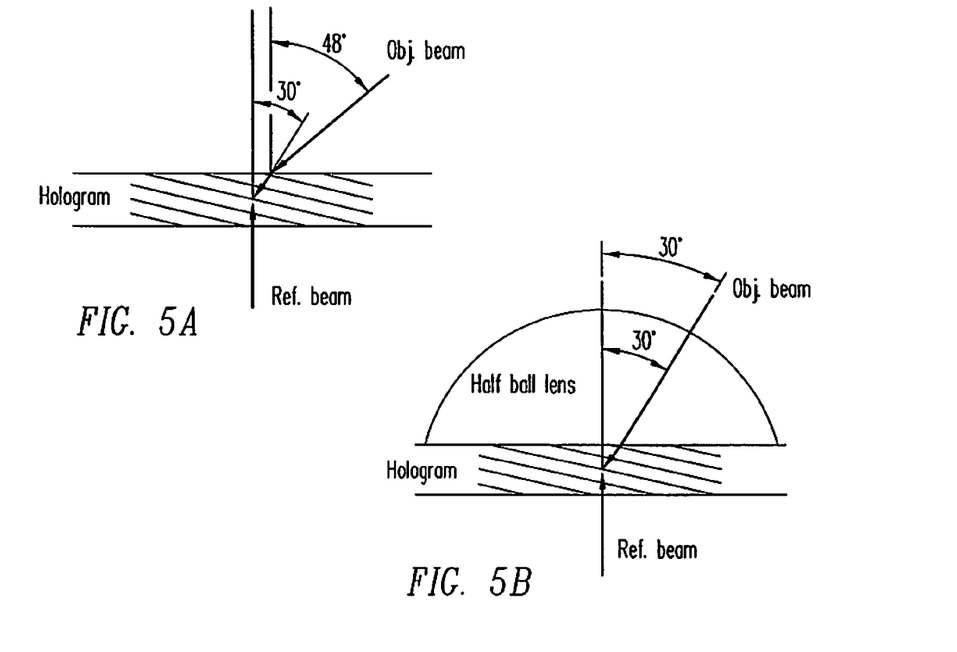
FIGS. 5A–5B further illustrate the operation of the device of FIG. 4A.

FIGS. 5A–5B further illustrate the effect of using hemispherical lens 420. The two illustrated geometries yield an identical holographic structure. In the geometry of FIG. 5A, the object beam (or at least the steepest ray of the object beam) is incident on the holographic recording material directly. The incident angle inside the holographic recording material is smaller than that in the air because of refraction of the object beam ray. For example, if the incident angle in the air is 48°, then the angle in the material is approximately 30° per Snell's law, assuming the index of refraction of the holographic material is approximately 1.48. However, in the geometry of FIG. 5B, the hemispherical lens is used to prevent the incident object beam from changing direction. With the incident object beam always perpendicular to the lens surface, its light is directly coupled into the holographic recording material. In this case, a 30° incident angle in the air will produce the same holographic grating orientation as that produced using the geometry of FIG. 5A. Thus, wider field-of-view holograms can be recorded with existing (or simpler) Fourier transform lenses.

The advantages of this general design include simplicity, low cost, and effectiveness. The approach is directly applicable to existing hologram recorder technology, can be introduced into such devices relatively simply, and can potentially render expensive optics obsolete. Moreover, such devices and techniques can be can be used for both disk and off-axis hologram formats. The technique is energy efficient because no major Fresnel reflection losses occur when the object beam enters the recording material. In addition, Fresnel reflections that usually result in decreased recording efficiency of high angle grating components are avoided, resulting in a hologram with more consistent brightness for all viewing angles.

Numerous experiments have been conducted to demonstrate the effectiveness of this technique. Hogels have been produced exhibiting a field-of-view of approximately 170–180° when illuminated with white light. Both off-axis and disk format hologram samples have been demonstrated using the technique, with equally successful results.

FIGS. 4A and 5B suggest that the hemispherical lens can be placed directly on the holographic recording material. In some embodiments, this can be performed, but some amount of force may be necessary (e.g., using a vacuum chuck) to hold the lens and holographic recording material closely together. This is generally required to expel any air that might otherwise be trapped between the lens and the holographic recording material, thereby causing unwanted refraction. In still other examples, an index-matching fluid is used between the lens and the holographic recording material. Numerous different suitable index-matching fluids will be known to those having ordinary skill in the art, and can include: water, mineral oil, FC-43 and FC-104 (manufactured by 3M Corporation), Decalin (manufactured by Eastman Kodak), index-matching fluids produced by Cargille Labs, and the like. Certain index-matching fluids, e.g., distilled water, are particularly advantageous because of their involatility, simple clean Lip, and evaporation. This is desirable for implementing these techniques in high speed digital hologram recorders, where the hogel writing heads move quickly across the film and film processing (and cleaning) time should be minimized. In still another example, the holographic recording material is deposited immediately before a hogel is recorded. Thus, the holographic recording material may still be in a sufficiently liquid or otherwise pliant state to achieve adequate coupling to the hemispherical lens.

Figure 6:
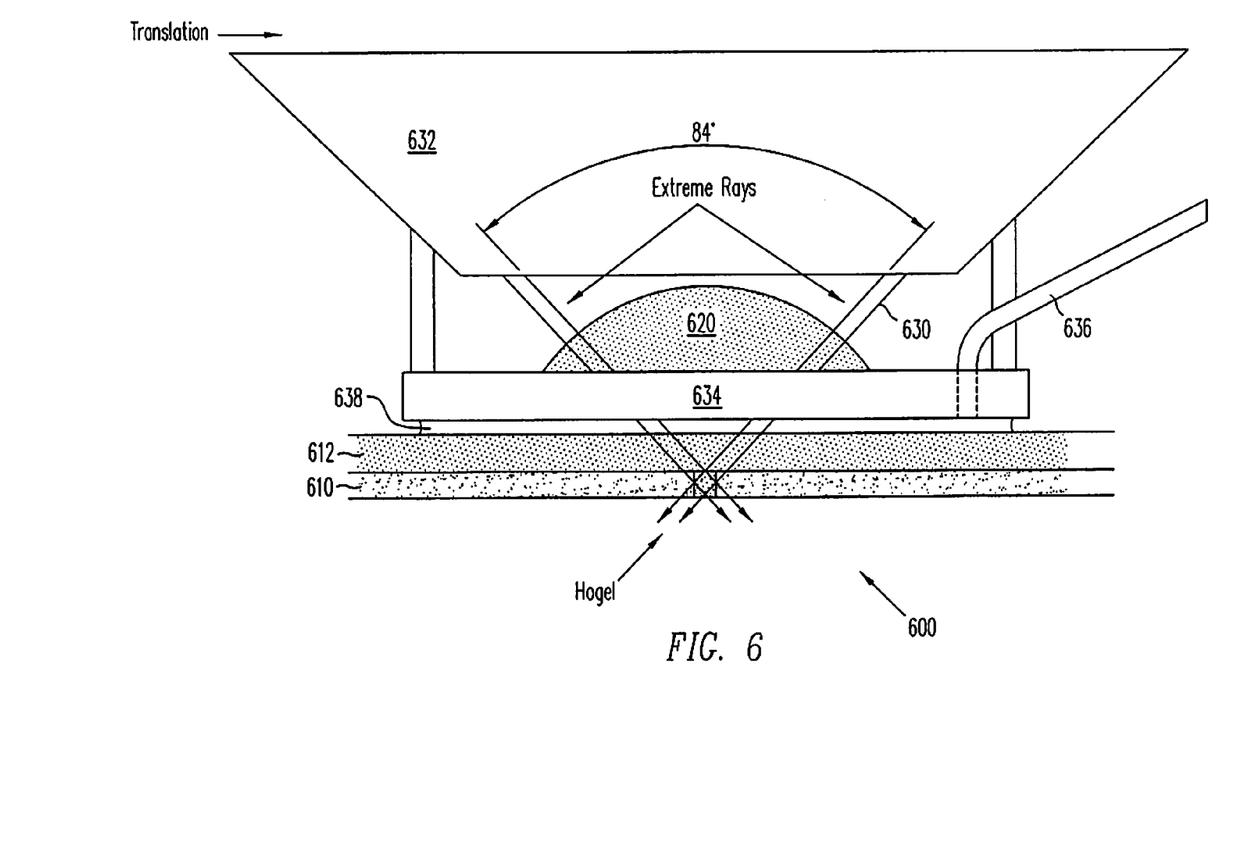
FIG. 6 illustrates a simplified diagram of still another example of a wide field-of-view hologram recording device and technique.

FIG. 6 illustrates a more detailed example of a hologram recorder 600 using a lens similar to lens 420 to provide coupling of the object beam into holographic recording material without any additional change in object beam angle. Like recorder 400 of FIG. 4A, recorder 600 is configured to record reflection holograms in a manner similar to the recorder illustrated in FIG. 1. Lens 632 (similar to lens FTL from FIG. 1) provides an object beam 630 that is focused and directed at holographic recording material 610. In this example, holographic recording material 610 is shown positioned on a substrate material 612 as is common in many recording systems. Substrate 612 is located between holographic recording material 612 and the remaining optics system to protect the recording material and allow for more convenient translation of the optics system. For convenience, a reference beam is not shown, but would be used as is well known in the art. See, for example, the configuration of FIG. 1.

Instead of having the converged object beam entering the recording material directly from the output of Fourier transform lens 632, recorder 600 uses a spherical section piano-convex lens 620 that is inserted in between lens 632 and holographic recording material 610. Lens 620 is mounted in platen 634 that in turn is mounted to the housing of Fourier transform lens 632. One example of platen 634 includes conventional lens mounting features and an aperture (not shown) so that the planar side of lens 620 is placed in contact with index-matching fluid 638 and object beam 630 can pass through lens 620, index-matching fluid 638, substrate 612, and into holographic recording material 610. In still another example, some or all platen 634 is transparent and adequately index-matched to lens 620 and index-matching fluid 638. Thus, lens 620 can be attached (e.g., with an index matching fluid or adhesive) to platen 634 and object beam 630 passes through transparent portions of the platen. In either example, platen 634 also supports the supplying (an possibly the subsequent removing) of index-matching fluid 638. Fluid feed 636 (typically coupled to a fluid reservoir and/or pump not shown) allows index-matching fluid to flow between platen 634 and substrate 612.

Lens 620 is designed to directly couple object beam 430 into holographic recording material at the same angle of incidence at which the object beam immerges from lens 632, i.e., without additional refraction of the object beam. To that end, lens 620 is typically selected to have an index of refraction close to (or identical to) that of holographic recording material 610. The size and shape of lens 620 is selected to ensure that object beam rays are normal (or approximately normal) to the lens surface when they intersect the lens, thereby reducing or eliminating refraction as the object beam crosses the interface from outside to inside lens 620. Since it is generally desirable that light from the Fourier transform lens be normally incident on the inserted lens at every point on the lens, some implementations can use specially shaped lenses other than hemispherical lenses.

As shown in recorder 600, lens 620 is not, strictly speaking, hemispherical. Because of the intervening holographic recording material substrate (and potentially both the index-matching fluid and the platen), the focus of lens 632 (where the hogel will be recorded) is further away from the planar surface of lens 620 than the example of FIG. 4A. Thus, in some embodiments, plano-convex lenses are used that are not hemispherical, but instead represent a section of a sphere. In still other examples, lens 620 can be aspheric to accommodate differently designed Fourier transform lenses. As noted above, the requirements of current Fourier transform lenses can be relaxed, simplifying their design and reducing their cost. For example, lens 632 can be designed to produce an 84° object beam (as shown) and still allow holograms that, when displayed, possess an approximately 180° field-of-view. Moreover, lens 632 and lens 620 can be combined into a single refractive system, and/or designed with each other's characteristics in mind.

As shown in FIG. 6, the optics system is designed to be translated with respect to the holographic recording material and substrate. In other embodiments, the holographic recording material and substrate can be translated with respect to stationary optics.

Those having ordinary skill in the art will readily recognize that a variety of different types of optical components and materials can be used in place of the components and materials discussed above. For example, for certain applications, e.g., horizontal parallax-only holograms, cylindrical optical components can be used. Moreover, the description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. An apparatus comprising:
   a light source that produces a coherent beam;
   a beam splitter that splits the coherent beam into an object beam and a reference beam;
   an object beam optical system for directing the object beam to interfere with the reference beam at a holographic recording material, wherein the object beam optical system includes:
   a spatial light modulator for intensity modulating the object beam;
   a collimating lens configured to collimate the object beam; and
   an aspheric reflector configured to focus the collimated object beam to a location within the holographic recording material, wherein the aspheric reflector is positioned with respect to the holographic recording material so that a focus of the aspheric reflector substantially coincides with the holographic recording material;
   a reference beam optical system for directing the reference beam to interfere with the object beam at the holographic recording material; and
   a computer coupled to the spatial light modulator and programmed to control delivery of a rendered image to the spatial light modulator.

2. The apparatus of claim 1 wherein the aspheric reflector includes a first aspheric mirror surface positioned to reflect and focus the collimated object beam at the location within the holographic recording material.

3. The apparatus of claim 2 wherein the aspheric mirror surface is parabolic.

4. The apparatus of claim 1 wherein the aspheric reflector further comprises:
   a first aspheric mirror surface; and
   a second aspheric mirror surface, wherein the first aspheric mirror surface is positioned to reflect the collimated object beam toward the second aspheric mirror surface, and wherein the second aspheric mirror surface is positioned to reflect and focus the object beam at the location within the holographic recording material.

5. The apparatus of claim 4 wherein the first aspheric mirror surface is parabolic, and wherein the second aspheric mirror surface is elliptical.

6. The apparatus of claim 4 wherein a focus of the first aspheric mirror surface substantially aligned with a focus of the second aspheric mirror surface.

7. The apparatus of claim 1 wherein the light source is at least one of a pulsed laser and a continuous wave laser.

8. The apparatus of claim 1 further comprising:
   a material holder for holding the holographic recording material; and
   a material holder translation system operable to position the material holder holding holographic recording material.

9. An apparatus comprising:
   a light source that produces a coherent beam;
   a beam splitter that splits the coherent beam into an object beam and a reference beam;
   an object beam optical system for directing the object beam to interfere with the reference beam at a holographic recording material, wherein the object beam optical system includes:
   a collimating lens configured to collimate the object beam; and
   an aspheric reflector configured to focus the collimated object beam to a location within the holographic recording material wherein the aspheric reflector is positioned with respect to the holographic recording material so that a focus of the aspheric reflector substantially coincides with the holographic recording material; and wherein the aspheric reflector includes an aperture through which the reference beam can pass;
   a reference beam optical system for directing the reference beam to interfere with the object beam at the holographic recording material.

10. An apparatus comprising:
    a light source that produces a coherent beam;
    a beam splitter that splits the coherent beam into an object beam and a reference beam;
    an object beam optical system for directing the object beam to interfere with the reference beam at a holographic recording material, wherein the object beam optical system includes:
    a collimating lens configured to collimate the object beam; and
    an aspheric reflector configured to focus the collimated object beam to a location within the holographic recording material, wherein the aspheric reflector is positioned with respect to the holographic recording material so that a focus of the aspheric reflector substantially coincides with the holographic recording material; and wherein the aspheric reflector includes at least one substantially non-reflective portion through which the reference beam can be transmitted;
    a reference beam optical system for directing the reference beam to interfere with the object beam at the holographic recording material.

11. An apparatus comprising:
    a light source that produces a coherent beam;
    a beam splitter that splits the coherent beam into an object beam and a reference beam;
    an object beam optical system for directing the object beam to interfere with the reference beam at a holographic recording material, wherein the object beam optical system includes:

a collimating lens configured to collimate the object beam;

an aspheric reflector configured to focus the collimated object beam to a location within the holographic recording material, wherein the aspheric reflector is positioned with respect to the holographic recording material so that a focus of the aspheric reflector substantially coincides with the holographic recording material; and;

an object beam optics translation system configured to translate the aspheric reflector with respect to the holographic recording material; and a reference beam optical system for directing the reference beam to interfere with the object beam at the holographic recording material.

12. A method comprising:

providing a holographic recording material;

providing data for at least one hogel to a spatial light modulator;

intensity modulating an object beam from a laser with the spatial light modulator;

reflecting the object beam from an aspheric reflector, wherein the aspheric reflector is positioned with respect to the holographic recording material so that a focus of the aspheric reflector substantially coincides with the holographic recording material; and exposing a portion of the holographic recording material to an interference pattern formed by a reference beam from the laser and the object beam from the laser.

13. The method of claim 12 further comprising:

collimating the object beam before the reflecting the object beam from the aspheric reflector.

14. The method of claim 12 wherein the aspheric reflector includes a first aspheric mirror surface positioned to reflect and focus the object beam at the location within the holographic recording material.

15. The method of claim 14 wherein the aspheric mirror surface is parabolic.

16. The method of claim 12 wherein the aspheric reflector further comprises:

a first aspheric mirror surface; and a second aspheric mirror surface, wherein the first aspheric mirror surface is positioned to reflect the object beam toward the second aspheric mirror surface, and wherein the second aspheric mirror surface is positioned to reflect and focus the object beam at the location within the holographic recording material.

17. The method of claim 16 wherein the first aspheric mirror surface is parabolic, and wherein the second aspheric mirror surface is elliptical.

18. The method of claim 16 further comprising:

positioning a focus of the first aspheric mirror surface to substantially overlap with a focus of the second aspheric mirror surface.

19. The method of claim 12 wherein the aspheric reflector includes an aperture through which the reference beam can pass.

20. The method of claim 12 wherein the aspheric reflector includes at least one substantially non-reflective portion through which the reference beam can be transmitted.

21. The method of claim 12 further comprising:

holding the holographic recording material in a material holder; and translating the aspheric reflector with respect to the holographic recording material.

22. The method of claim 12 further comprising:

holding the lens in a first position; and translating the holographic recording material with respect to the aspheric reflector.

23. The method of claim 12 further comprising:

forming at least one hogel in the holographic recording material, wherein the at least one hogel corresponds to the data for at least one hogel provided to the spatial light modulator.

24. The method of claim 12 further comprising:

transmitting the data for at least one hogel to the spatial light modulator using a computer coupled to the spatial light modulator, wherein the data for at least one hogel corresponds to a rendered image.

25. The method of claim 12 wherein the laser is at least one of a pulsed laser and a continuous wave laser.

* * * * *